(12) United States Patent
Bartlett (10) Patent No.: US 6,476,736 B2
(45) Date of Patent: Nov. 5, 2002

(54) SINGLE INTERCONNECT, MULTI-BIT INTERFACE (75) Inventor: Donald M. Bartlett, Fort Collins, CO (US)

(73) Assignee: Applied Micro Circuits Corporation, Fort Collins, CO (US)

(*) Notice: Subject to any disclaimer, the term of this patent is extended or adjusted under 35 U.S.C. 154(b) by 0 days.

(21) Appl. No.: 09/941,245

(22) Filed: Aug. 27, 2001

(65) Prior Publication Data
US 2002/0024454 A1 Feb. 28, 2002

Related U.S. Application Data
(60) Provisional application No. 60/228,003, filed on Aug. 25, 2000.

(51) Int. Cl.[7] ................................................. H03M 5/02
(52) U.S. Cl. ............................ 341/56; 341/57; 341/61; 341/102; 341/103
(58) Field of Search .......................... 341/50, 51, 56, 341/63, 64, 75

(56) References Cited
U.S. PATENT DOCUMENTS 4,532,638 A * 7/1985 Lagger et al. ............... 341/138
5,222,105 A * 6/1993 Kinney et al. ................ 341/70
5,334,978 A * 8/1994 Halliday ....................... 341/70
6,104,321 A * 8/2000 Akagiri ......................... 341/50

* cited by examiner

Primary Examiner—Patrick Wamsley
Assistant Examiner—Lam T. Mai
(74) Attorney, Agent, or Firm—William W. Cochran, II (57) ABSTRACT Disclosed is transmission of a signal over a single interconnect between functional blocks of the IC. A scaled or encoded signal responsive to a first digital signal is generated by summing currents responsive to the first control signal. The summed currents, which may be the sum of one or more currents, is the scaled signal. The encoded signal is transmitted over a single interconnect. This transmission occurs in one clock period in contrast to the at least two clock periods required to serially transmit data. The encoded signal is then used to generate a second digital signal. The generation of the second digital signal preferably includes mirroring the current of the encoded signal. The mirrored current is can then generate one or more separate voltages which are used to generate the second digital signal.

17 Claims, 12 Drawing Sheets

SINGLE INTERCONNECT, MULTI-BIT INTERFACE

CROSS-REFERENCE TO RELATED APPLICATIONS

The present invention is based upon and claims priority from U.S. provisional application Ser. No. 60/228,003 filed Aug. 25, 2000 entitled "A Single Interconnect, Muli-bit Interface" by Donald M. Bartlett.

FIELD OF THE INVENTION

The present invention relates to space-saving signal transmission and more particularly to a multi-bit interface that utilizes a single interconnect to transmit a control or data signal.

BACKGROUND OF THE INVENTION

To provide signal paths between circuit blocks of an integrated circuit (IC), connection layers such as metal layers or polysilicon layers are used. These connection layers, also known as interconnects, require some finite width and thickness to ensure reliability of the interconnect and signal integrity thereof. When numerous signal paths are required between circuit blocks, the routing congestion caused by placement of the associated interconnects will increase the overall size of the IC and thus increase the cost of the product. That congestion has an increased effect when the area between the circuit blocks is limited. A further problem arises when numerous tightly-spaced functional blocks require a high number of signal paths between them. The associated numerous interconnects will cause even more IC area congestion that will further increase the IC size and associated cost.

Interconnect congestion often occurs when programmability is added to a function that is implemented in a relatively small area of the IC. For example, an Input/Output pad cell that requires programmability to adjust either the output slew rate or the output drive strength, or both, may use an analog circuit controlled by digital signals to accomplish the adjustment. Many digital control-signals may be required to achieve the desired programmable range of the controlled analog circuit. Those digital control signals typically require numerous signal paths between the circuit block generating those signals and the controlled analog circuit. The associated interconnects of those paths will add significantly to the IC area congestion when attempting the physical implementation, i.e., routing, of those interconnects.

Figure 1:
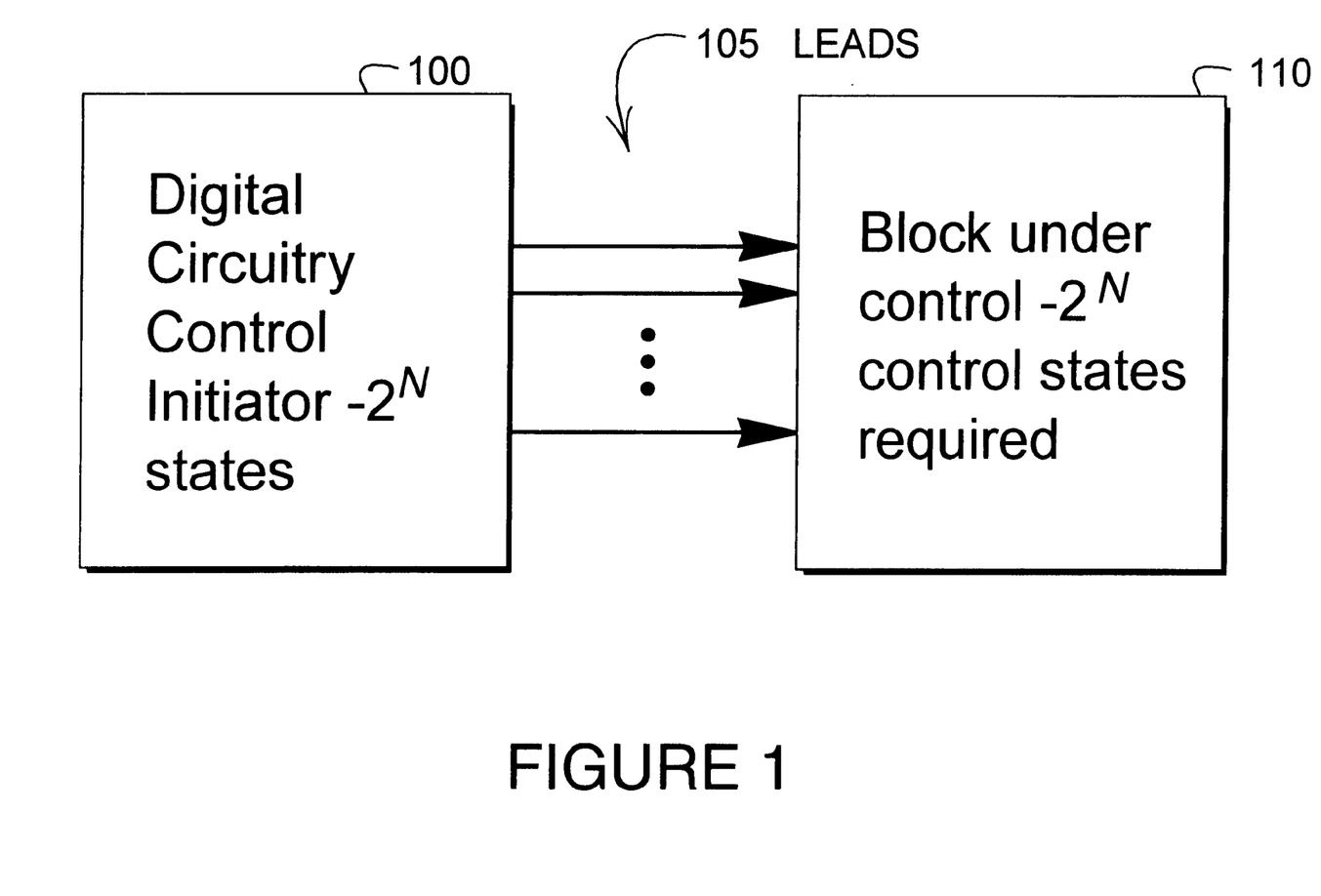
FIG. 1 is a block diagram of a typical digital control interface.

One method to reduce the number of associated interconnects for the required digital control signals is to utilize a digital decoder proximate to the circuit of the functional block receiving those control bits. This can reduce the number of interconnects required between the circuit block generating those signals and the receiving circuit. FIG. 1 shows a block diagram that performs such a function. Initiator 100 generates Y signals for up to $2^Y$ control bits. The Y signals are provided to block under control 110 via leads 105. Leads 105 must have Y leads.

However, the number of leads can be reduced only to N, where n is determined from the constraint:

$$2^{N-1} < \text{\# of control bits} \leq 2^N.$$

Thus, if 9 control bits are required, N is 4. For this case, the interconnect that provides the bit for the ninth control signal may be infrequently used. Consequently, that interconnect is inefficient since it wastes IC area, more so than the inefficiency caused by the other N-1 interconnects.

Another method uses a single-wire interface, but requires a data serializer that shifts the parallel information to serial information. The time required to communicate the serial data over the single wire is dependent upon the number of bits and is greater than the time required to transfer the parallel information if the clock period of the parallel information transfer is less than the sum of the clock periods needed to transfer the serial data. A variation of this method may utilize a sum of the clock periods for the serial data transfer that is less than the clock period for the parallel information transfer. The problem with this variation is that a high speed clock must be derived from the system clock. Such derivation will require extra circuitry in addition to the extra circuitry required for the parallel-to-serial and the serial-to-parallel shift registers. Moreover, the serial information must be received in its entirety before any parallel information can be discerned. That would require multiple clock periods equal to the number of bits serially transmitted. Consequently, time is wasted for the second and additional clock periods required to receive the serially transmitted data, regardless of the clock speed.

Accordingly, a need exists that will provide the required number of control signals while further reducing the number of associated interconnects or that will require minimal additional circuitry and time to relay the control signals. The present invention meets this need.

SUMMARY OF THE INVENTION

The present invention overcomes the disadvantages and limitations of the prior art by providing a method to relieve the routing congestion described above by further reducing the number of interconnects to be routed, especially in a confined area. To that end, a digitally encoded signal is transmitted over a single interconnect that does not significantly add congestion or complexity on the IC, active silicon area when implemented on a silicon-based IC or additional time for signal transmission. The present invention achieves that transmission by providing a scaled current signal that varies depending on the desired digital control signal.

Numerous other advantages and features of the present invention will become readily apparent from the following detailed description of the invention and the embodiment thereof, from the claims and from the accompanying drawings in which details of the invention are fully and completely disclosed as a part of this specification.

DETAILED DESCRIPTION OF THE PREFERRED EMBODIMENT

While this invention is susceptible to embodiment in many different forms, there is shown in the drawings and will be described herein in detail specific embodiments thereof with the understanding that the present disclosure is to be considered as an exemplification of the principles of the invention and is not to be limited to the specific embodiments described.

The present invention provides a transmission of digitally encoded information over a single interconnect (also known as a line or wire) while not significantly adding congestion or complexity to the IC, or significantly increasing active silicon area when implemented on a silicon-based IC. Briefly, the present invention provides a scaled signal, preferably a scaled current signal, that varies depending on the desired digital output word. This scaled signal is transmitted to functional circuitry that requires a digital control signal. The digital control signal is encoded into the scaled signal. That functional circuitry either includes or has associated therewith circuitry that will convert the scaled signal to the digital control signal.

Figure 2:
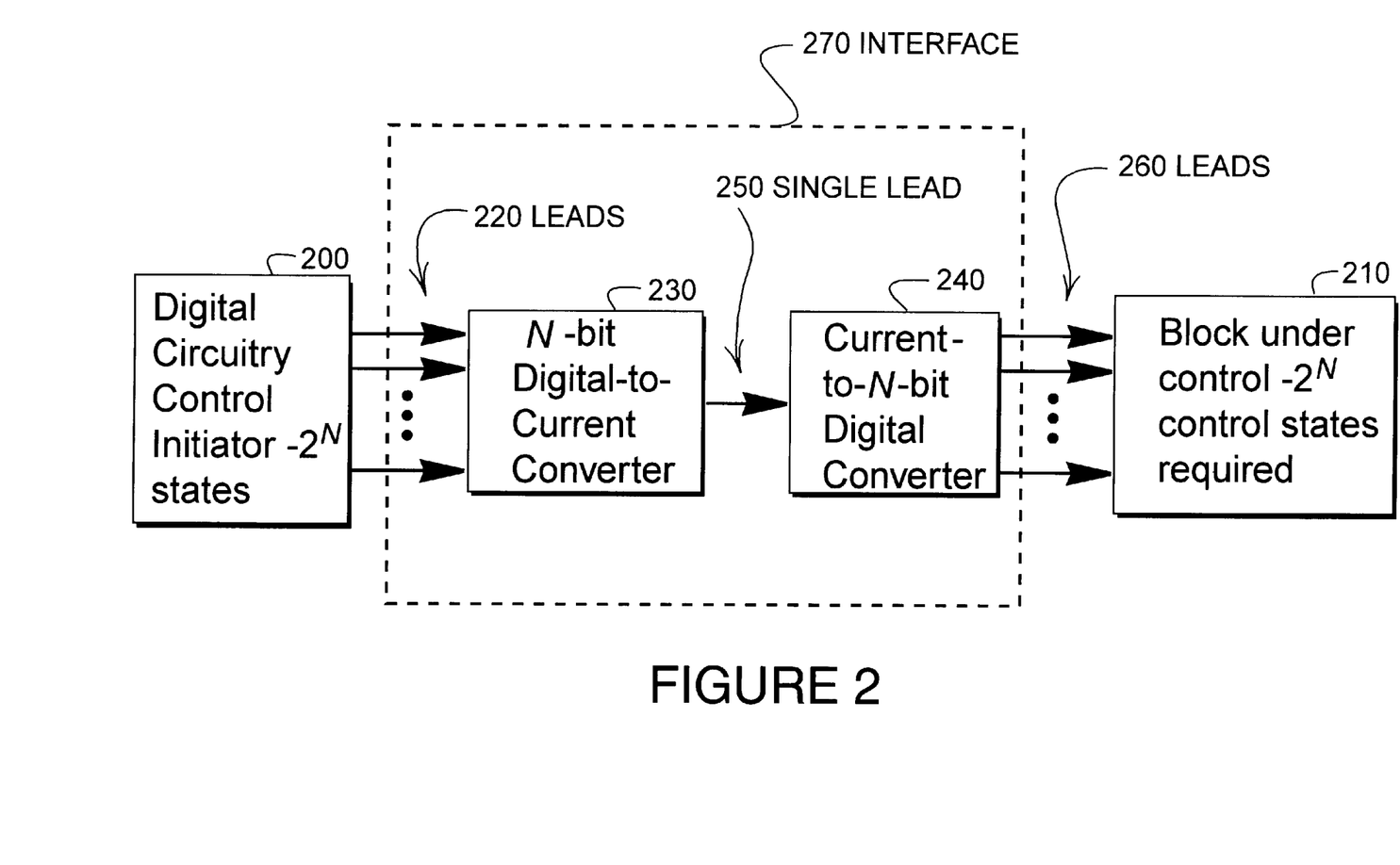
FIG. 2 is a block diagram of the preferred embodiment of the present invention.

FIG. 2 shows a top-level block diagram of the method of the present invention for transmitting digital information, such as digital control signals. A digital circuitry control signal initiator 200 generates digital control signals to control a block under control 210. Initiator 200 outputs the digital control signals as bits over respective leads 220. N-bit digital-to-current converter 230 converts the control signal bits to a corresponding current. The current is output from converter 230 to a current-to-N-bit digital converter 240 via a single interconnect or lead 250. Converter 230 can be connected to multiple converters 240 through multiple single connectors. Converter 240 converts the current back to the control signal bits, which are then provided to block under control 210 via respective leads 260. An interface 270 between initiator 200 and block under control 210 includes converters 230, 240 and interconnect 250.

Digital-to-Current Converter

Figure 3:
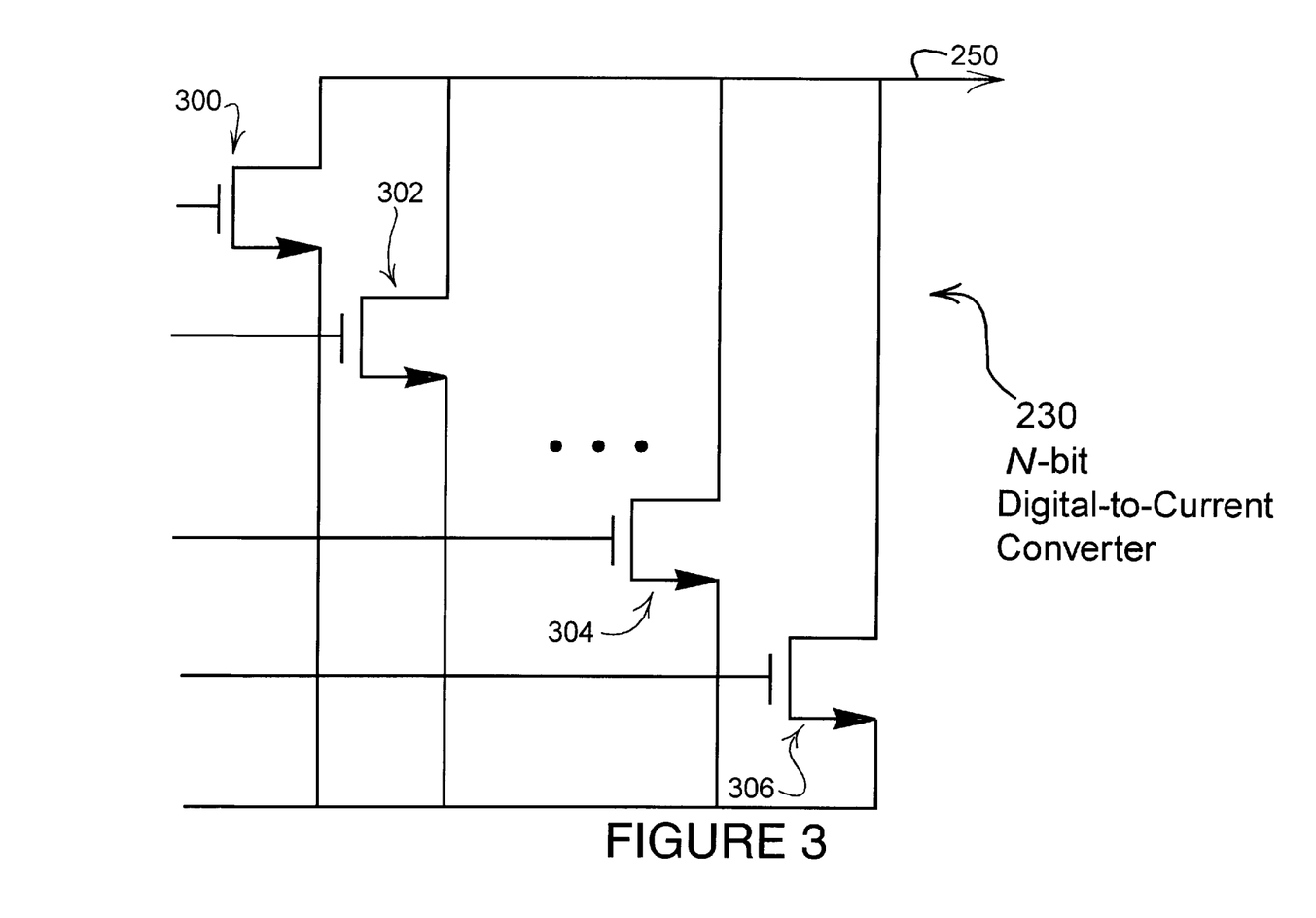
FIG. 3 is a schematic diagram of the N-bit digital-to-current converter shown in FIG. 2.

FIG. 3 shows the N-bit digital-to-current converter 230 of FIG. 2. Shown are current-producing n-channel encoding transistors 300, 302, 304, and 306. FIG. 3 uses notation to show that additional transistors may be included. The drains of each of transistors 300, 302, 304, and 306 are summed to generate the scaled current signal and provide that current signal on interconnect 250. Each of transistors 300, 302, 304 and 306 are proportionately sized by a predetermined increment such that, preferably, transistor 302 has a device size twice that of transistor 300 and thus produces twice the scaled current output of transistor 300. Transistor 304 has a device size three times that of transistor 300 and thus produces three times the scaled current output of transistor 300, etc. This sequence continues up to the point where transistor (N) produces N times the scaled current output of transistor 300. Transistors 300, 302, 304 and 306 can be sized in order to manage the power dissipation and the speed of interface 270. These ratios can be either integer multiples or any rational number or scaling factor. For example, the scaling factor may be a linear, exponential or geometric function.

Converter 230 receives a control signal as bits on leads 220. An active bit drives a transistor's gate preferably to the power supply voltage to produce a drain current that is used either by itself as the scaled current output or is summed with at least another drain current to form the scaled current signal.

In addition to the method described above, the digital-to-current converter can be configured with binarily weighted transistors. This allows the digital bits to drive the gates of the transistors themselves without first being translated into $2^n$ digital codes. The advantage to this approach is the reduction of circuitry due to the elimination of the decoder block. For the binarily weighted configuration, 300 has a value of 1×, 302 has a value of 2×, 304 a value of 4× and transistor(N) has a value of $2^{(n-1)}$, where n=190 of digital bits to be current encoded. Other scaling factors can be used such as geometric scaling factors.

Current-to-Digital Converter

Figure 4:
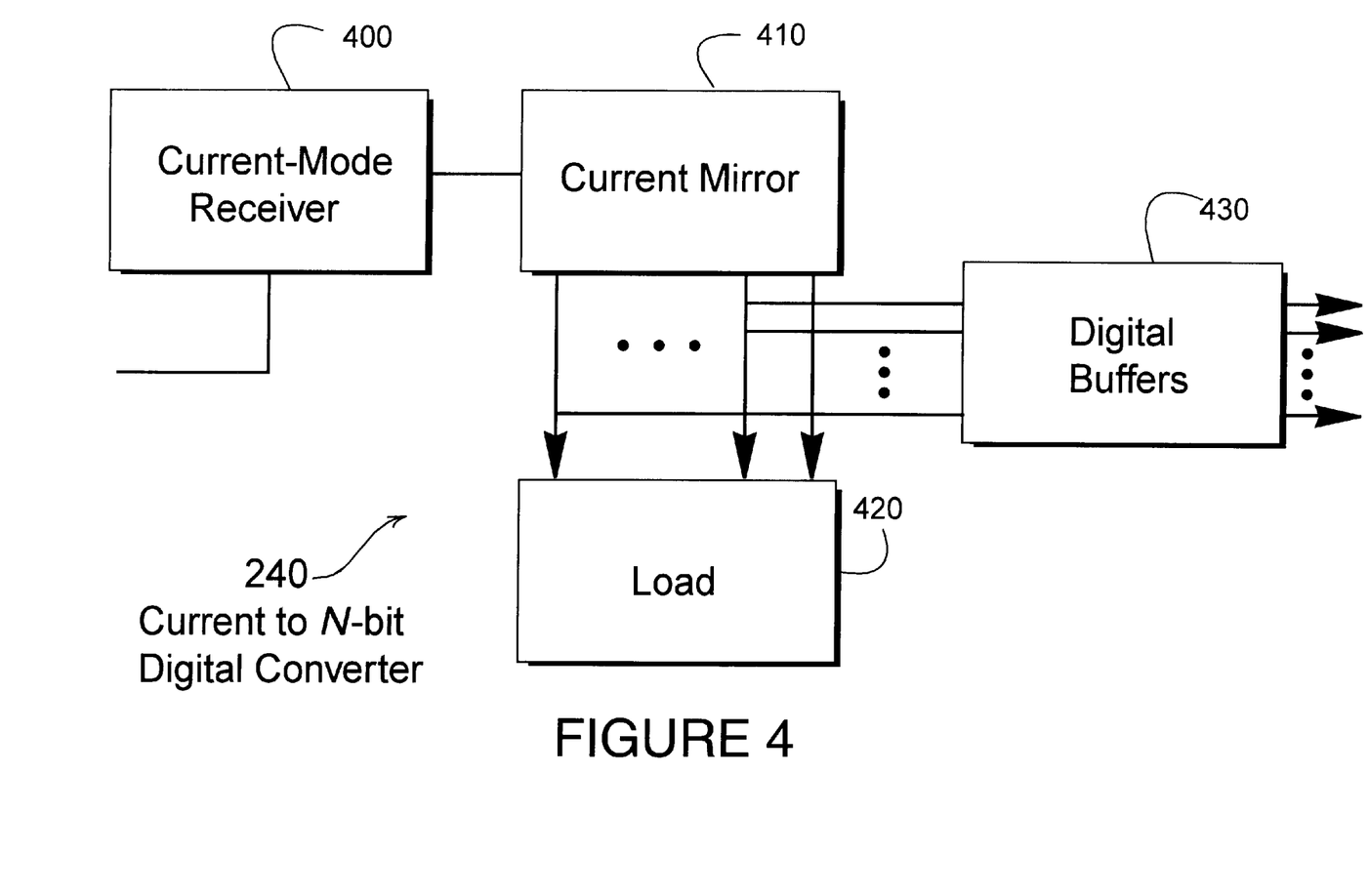
FIG. 4 is a block diagram of the current-to-N-bit digital converter shown in FIG. 2.

FIG. 4 illustrates a block diagram of the current-to-N-bit digital converter 240 of FIG. 2. Converter 240 preferably functions as a specialized current-mode, analog-to-digital converter. As can be seen in the figure, converter 240 preferably includes a current-mode receiver 400, a current mirror or source 410, a load 420 and digital buffers 430 that preferably have hysteresis.

Figure 5:
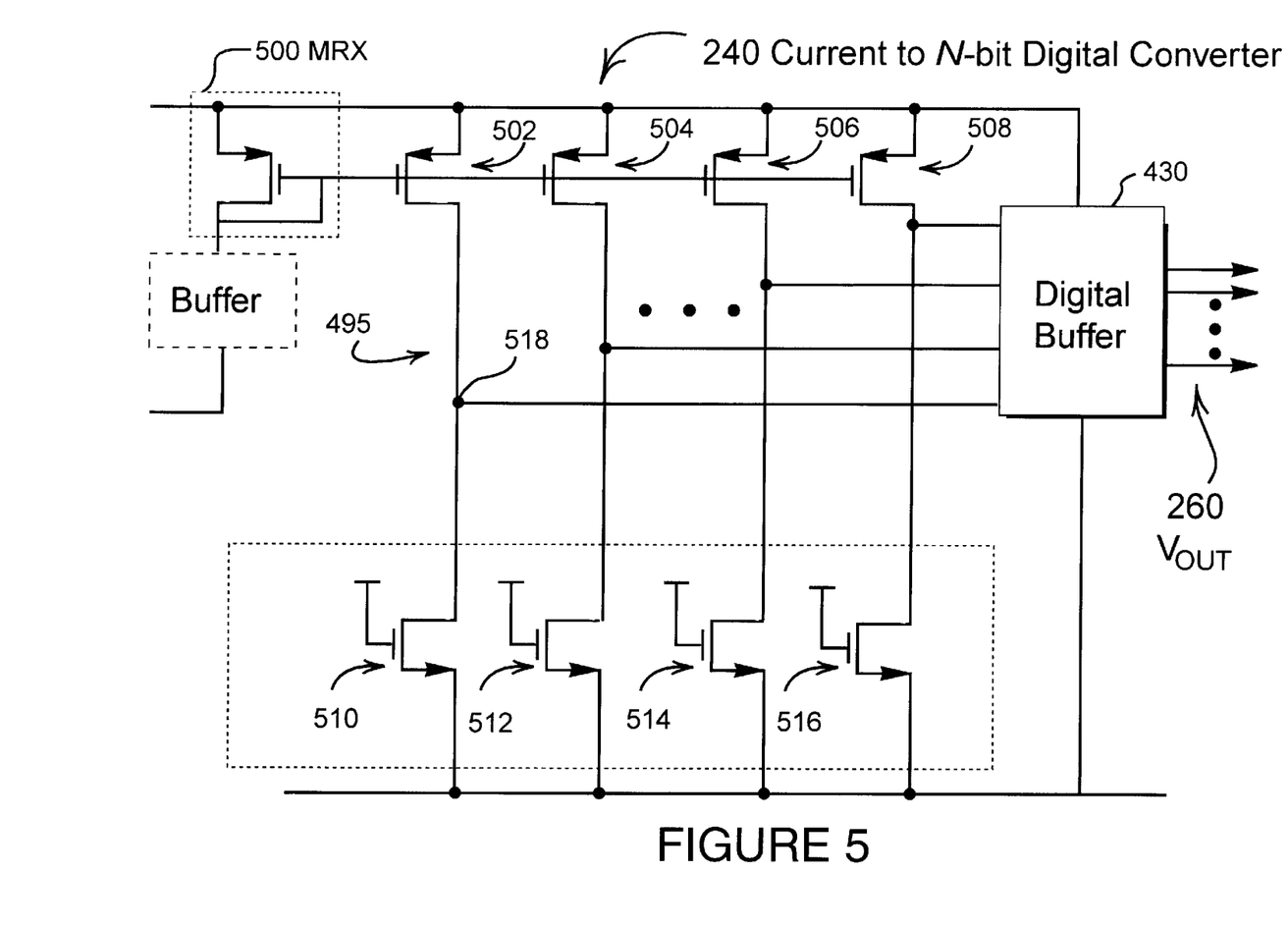
FIG. 5 is a schematic diagram of the current-to-N-bit digital converter shown in FIG. 4.

FIG. 5 is a schematic for the preferred implementation of converter 240 shown in FIG. 4. There are four preferred types of detector transistors shown in the figure. Transistor 500 is a diode connected p-channel transistor and acts as the current receiver 400. The drain and gate nodes of transistor 500 are tied together in a common "diode" configuration. The transistors 502 through 508 form the current source or mirror 410. By coupling each gate node of transistors 502 through 508 to the "diode" connected transistor 500, current sources are formed that mirror the current in transistor 500 in a ratio determined by the area ratios of 500 to the appropriate current mirror transistor. This method produces current sources with prescribed ratios. Transistors 502 through 508 are preferred p-channel devices. The dimension ratio of the current source transistors 502 through 508 to 500 is preferably 1:1, i.e., each of transistors 502 through 508 are the same size as transistor 500.

Each of the drains of the p-channel current sources transistors 502 through 508 are coupled to respective preferred n-channel load transistors 510 through 516. Load transistors 510 through 516 are included in load 420 of FIG. 4. Each drain of current source transistors 502 through 508 is coupled to a drain of the associated n-channel load transistor 510 through 516. By setting the sizing of the load devices 510 through 516 of the current-to-N-bit digital converter 240 to be a half transistor element ratio smaller than the corresponding transistors 300, 302 . . . 304 and 306 included in the N-bit digital-to-current converter 230, the voltage at the combined drain nodes of 502–508 and 510–516 (enumerated as 495) will vary depending on the value of current being decoded. For example, if a 1× current is being sent over interconnect 250 of FIG. 2, which means that transistor 300 in the digital-to-current converter 230 is turned on (see FIG. 3), and all of the other transistors 302–306 in digital-to-current converter 230 are turned off. Hence, a 1× current will flow in all stages of current mirror 410 and load 420 that are included in current-to-N-bit digital converter 240. Because of the scaling of the load devices 510 through 516, all of the loads except for 510 will attempt to sink more than a 1× current. This phenomenon is caused by the sizes of loads 512 through 516 being greater than the size of transistor 300 of digital-to-current converter 230 that generates the 1× current being sent over interconnect 250. Thus, all of the shared drain nodes 495 (FIG. 5) of the current sources transistors 502–508 and load transistors 510–516 will have a low voltage, approximately VSS, except for the node 518 formed by transistors 502 and 510. This node will go to an intermediate voltage between the voltages of VSS and VDD that will be interpreted as a digital "high" by the subsequent stage.

Figure 11:
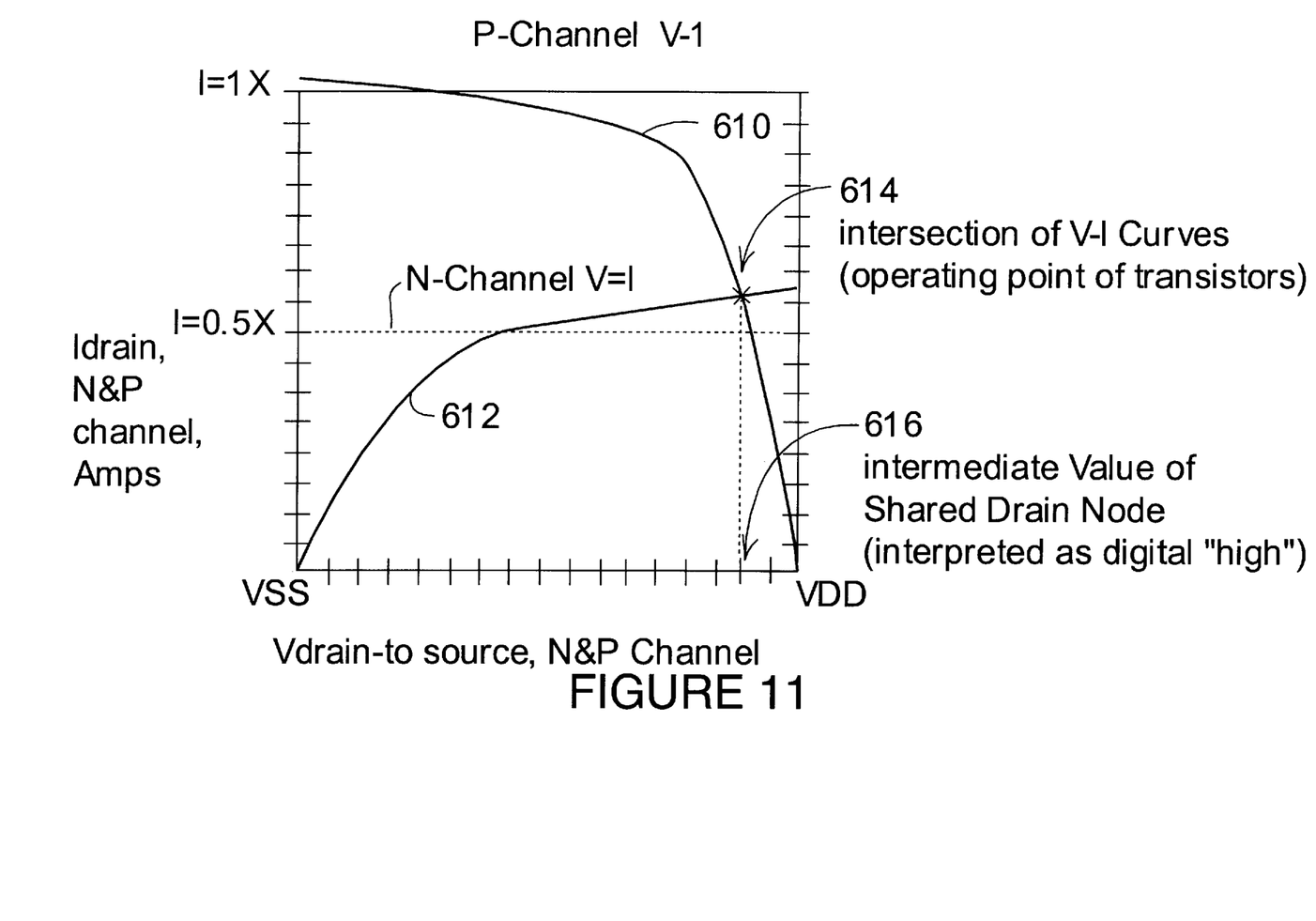
FIG. 11 is a load of a current source transistor and a load transistor.

FIG. 11 shows a load diagram of the current source transistor, 502 and the load transistor, 510. The two traces on the plot 610 and 612 represent the V-I characteristics of the transistor pairs of the current mirror/load, e.g., 502 and 510, 504 and 512, etc. This gives the bias conditions of these pairs of transistors. Again, assuming an input current of 1× is being sunk from the current receiver transistor, 500, then a 1× current flows in all of the current source transistors, 502 through 508. Also, as stated earlier, the load transistors, 510 through 516 will have the capability of sinking [N×(1×) −0.5×], therefore, 510 can sink a 0.5× current, 512 can sink a 1.5× current and soon. Because of the coupling of the drain nodes of each the current source transistor, 502 and the load transistor, 510, the current that flows in one must flow in the other. This requirement can be clearly identified in FIG. 11 by finding the point 614 at which the transistor pairs (502 and 510, 504 and 512, etc.) V-I characteristic plots intersect. The voltage of the shared drain node, therefore, can only be of the value that represents the intersecting point.

The previous example of the, 1× case can be extended for cases where the scaled current output provided by interconnect 250 to the current-to-N-bit digital converter 240 is 2× or 3×, or any other integer or real number multiple of the current. As the scaled current output increases, each of the successive combined drain nodes 495 will have its associated voltage increase from near 0V to either VDD or some intermediate voltage there between. In any event, the value of the shared drain node will either go the value that can be interpreted as a digital "high" or a digital "low". By coupling an inverter buffer (600 in FIG. 6) at each of the combined drain nodes 495, the value of the voltage can be sensed by the inverter to determine whether the current is greater than or less than the current the associated load transistor 502–508 is capable of sinking. When nodes 495 are low, i.e., approximately VSS, the inverter output is a digital high. When nodes 495 are at an intermediate value 616, the inverter output will be a digital low. It is obvious that the inverter can be replaced by a buffer, a Schmitt trigger or any other amplifying device that can sense a voltage input and produce a voltage output of digital logic levels.

Figure 6:
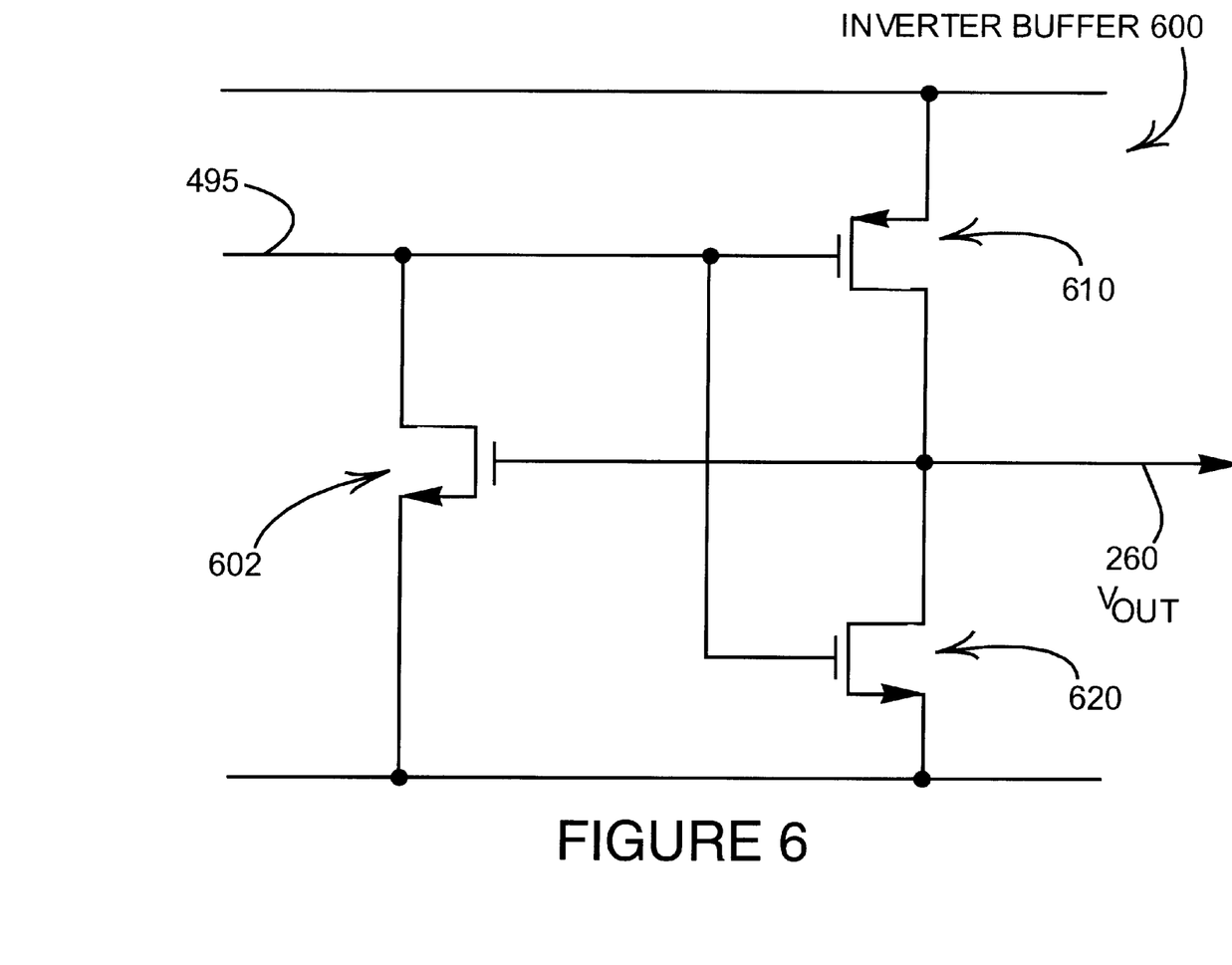
FIG. 6 is a schematic diagram of a variation of the current-to-N-bit digital converter shown in FIG. 4.

Referring to FIG. 6, a buffer 600 is schematically shown. Multiple buffers 600 form digital buffers 430 in FIG. 5. Transistor 602 provides hysterisis to ensure there is no voltage oscillation due to noise. The gate of transistor 602 is coupled to the inverter formed by transistors 610, 620.

Each of the output voltages $V_{OUT}$ from buffers 600 provided on leads 260 will be an inverted signal of the associated shared drain node voltage. The inverter outputs form what is known as an inverse thermometer code output. As the value of the input scaled current signal to converter 240 is increased, each of the successive outputs 260 will change from a digital one (=VDD) to a digital zero (=VSS). For example, if the input scaled current signal is equal to 10×, then outputs $V_{OUT(1)}$ through $V_{OUT(10)}$ (260) will be low (=VSS) and outputs $V_{OUT(11)}$ through $V_{OUT(N)}$ will be high (=VDD). These outputs can either be decoded or they can be used as a control signal for block under control 210.

This method provides $2^N$ unique states allowing for transmission of the value of a digital word over a single interconnect in an IC. This method greatly reduces the amount of space required to route multiple interconnects in a small area on an IC, thus reducing the amount of silicon area required. Other scaling factors can be used in accordance with the spirit of the present invention.

This circuit can also be accomplished by reversing all of the different types of CMOS transistors. That is, converter 230 can be implemented with p-channel transistors and the converter 240 can be implemented with current source transistors 502–508 as n-channels and load transistors 510–516 as p-channels.

Figure 7:
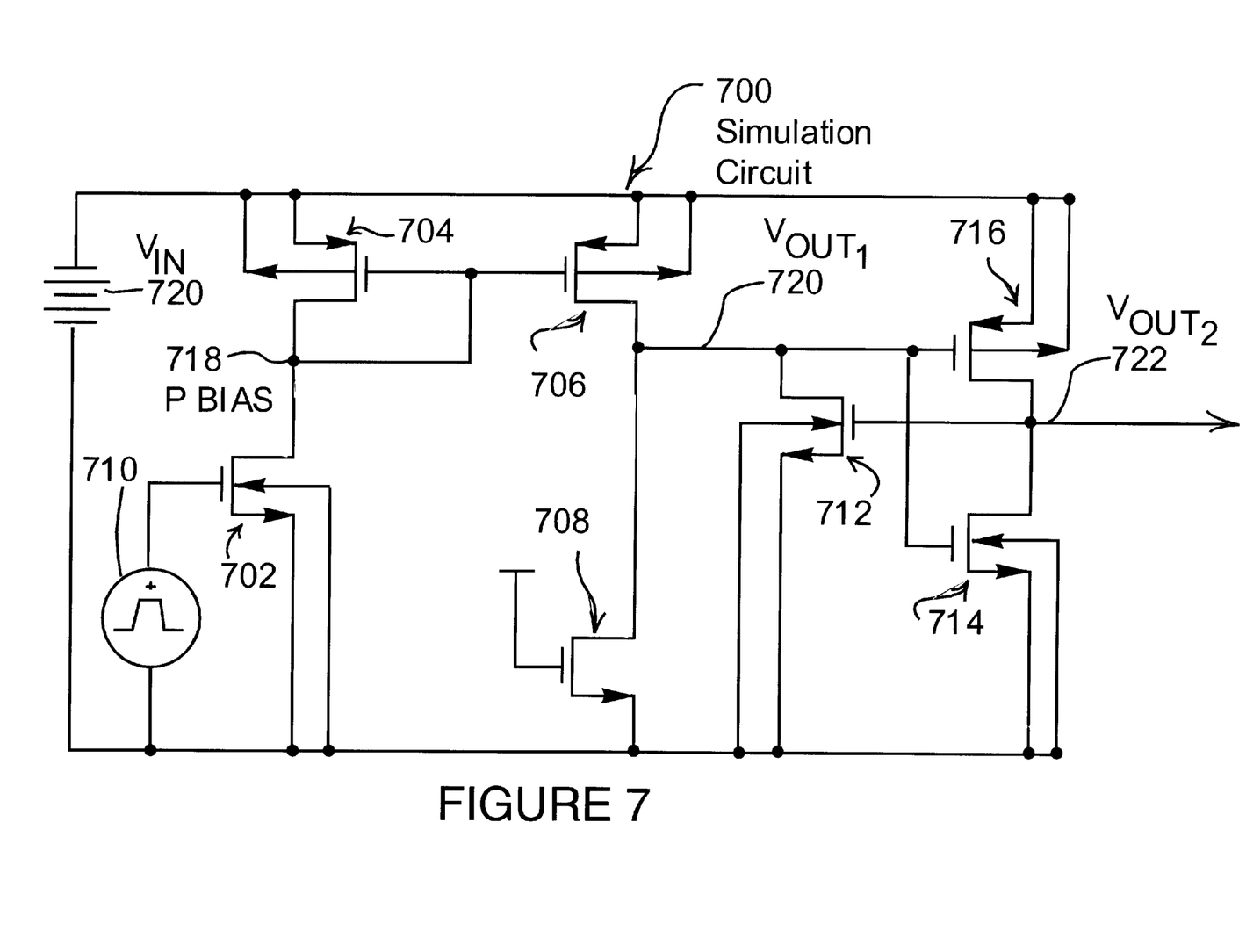
FIG. 7 is a schematic diagram of another embodiment of the present invention.

FIG. 7 illustrates a schematic of a circuit 700 that simulates converters 230 and 240. Circuit 700 includes a transistor 702 that exemplifies a 1-bit converter 230. A voltage supply $V_{IN}$ emulates a digital bit input. A transistor 704 represents current receiver 400. Transistors 706 and 708 represent current mirror 410 and load 420. Transistors 712, 714 and 716 form buffer 600. A voltage supply $V_{IN}$ represents the power supply voltage $V_{DD}$.

Figure 9:
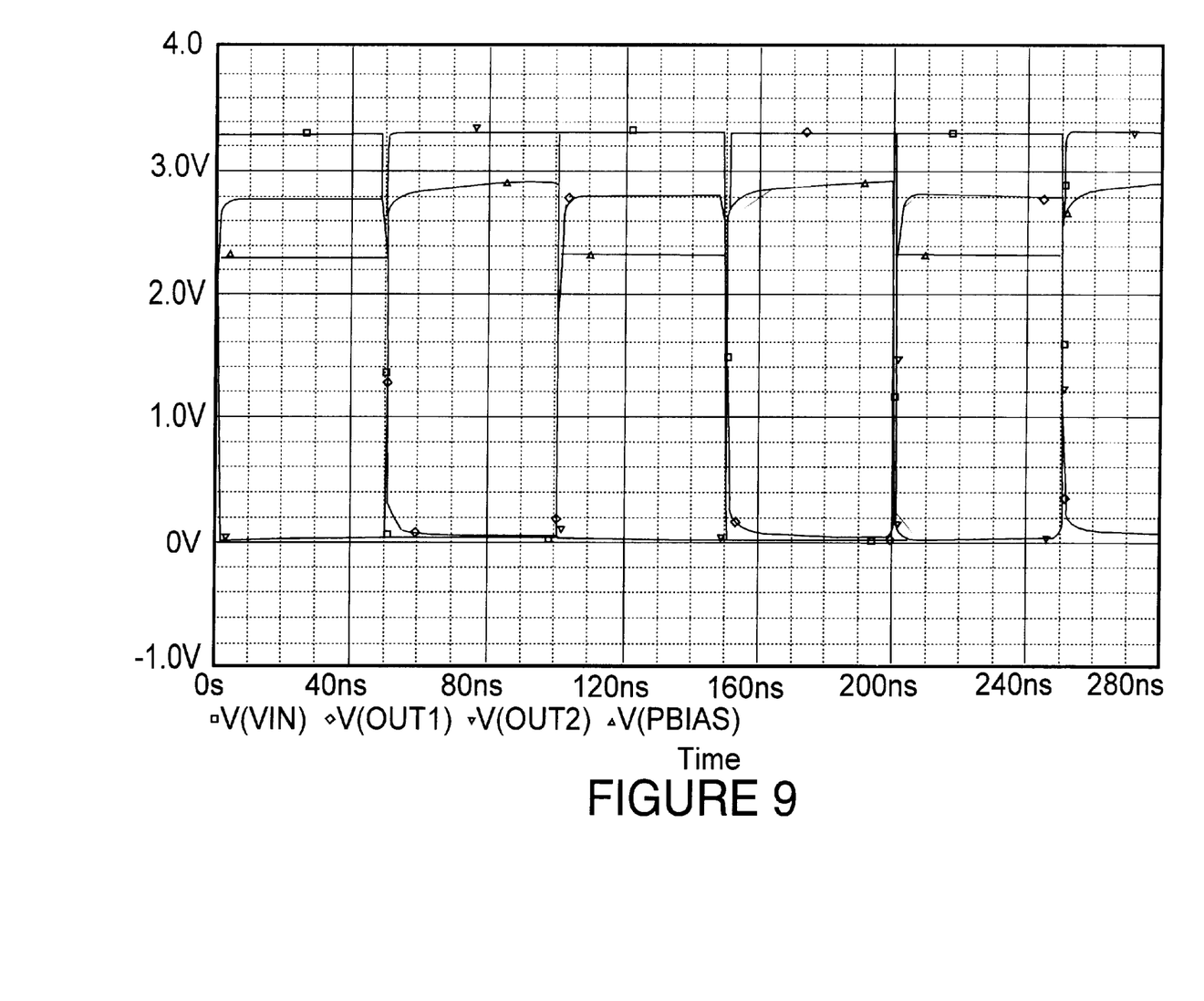
FIGS. 9 and 10 are timing diagrams for the circuit shown in FIG. 7.
Figure 10:
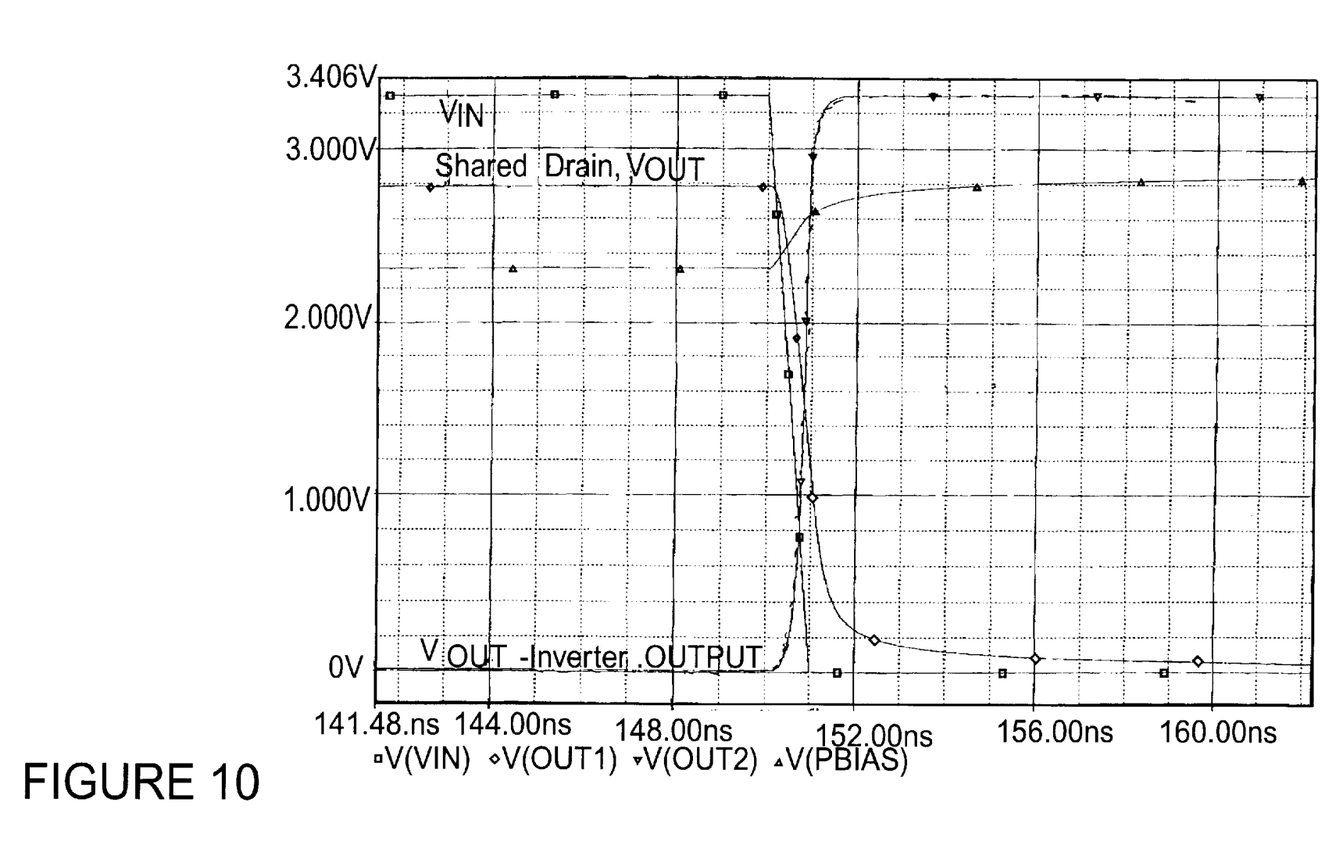

The operation of the simulation circuit 700 is exemplified by the timing diagram shown in FIG. 9. In that figure, 720 $V_{IN}$ and the voltages at nodes 718 $P_{BIAS}$, 720 $V_{OUT1}$ and 722 $V_{OUT2}$ are distinguished by a square, a diamond, a downward-pointing triangle and an upward-pointing triangle. The timing diagram depicts multiple transitions of $V_{IN}$ and the responsive transitions of the voltages at nodes 718 $P_{BIAS}$, 720 $V_{OUT1}$ and 722 $V_{OUT2}$. FIG. 10 shows a timing diagram that represents a portion of the FIG. 9 timing diagram with greater time resolution. The distinguishing symbols used in FIG. 10 are the same as in FIG. 9. Note that the response time for the voltage at 722 $V_{OUT2}$ is <½ ns from $V_{IN}$. For a 10-bit serial bit transmission to equal that performance, each bit must be clocked out of or into a shift register at a rate of 25 ps. The complexity, cost, and timing issues involved with such speed is virtually prohibitive in actual implementation.

Figure 8:
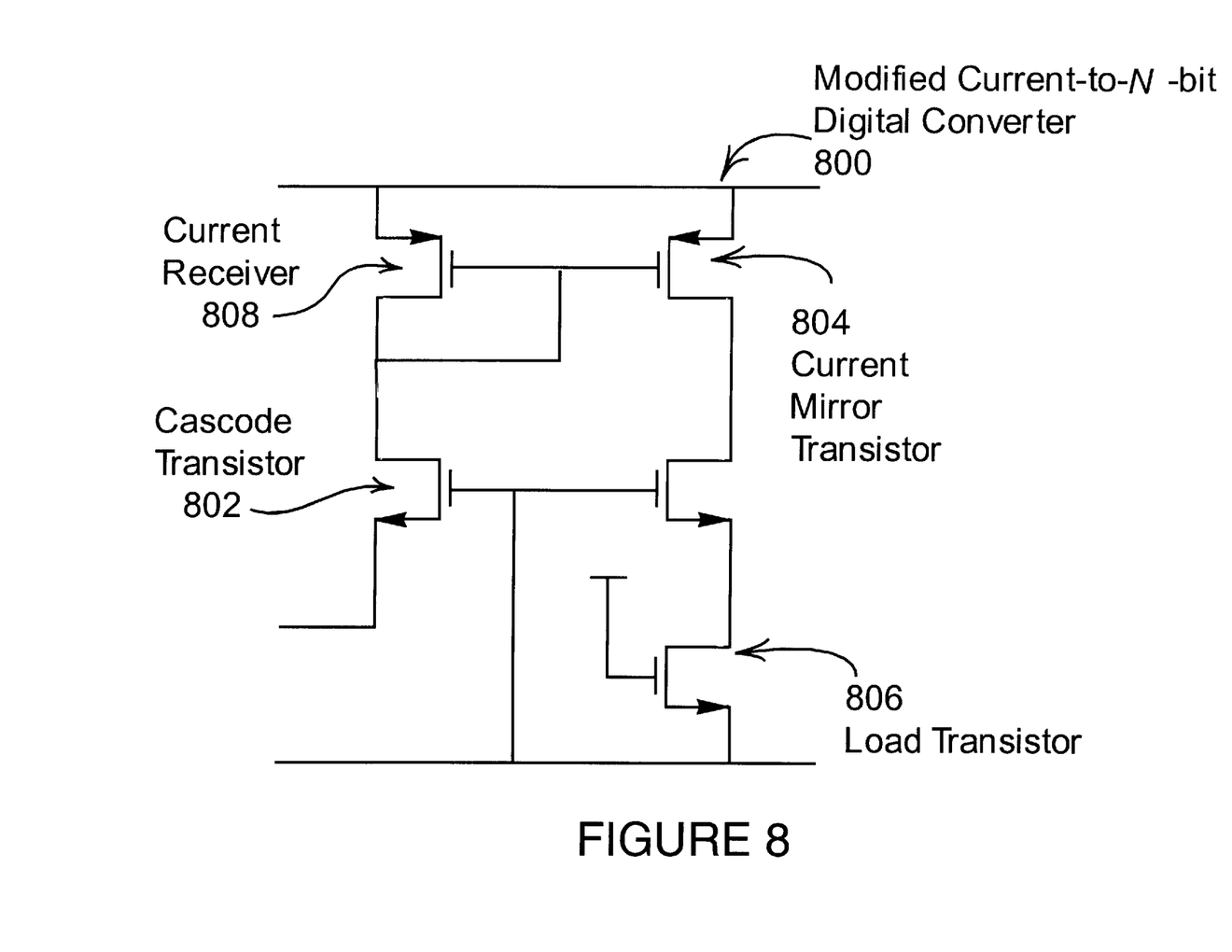
FIG. 8 is a schematic diagram of a variation of the other embodiment shown in FIG. 7.

FIG. 8 shows an alternative circuit 800 that is a modification of converter 240 (FIG. 5). N-channel transistor 802 provides a cascode function for the current source transistor 800 in the current-to-digital converter. The addition of the cascode transistor 802 helps reduce issues with the signal level translation (between the transmit and receive side) when there are different voltages or power supplies driving the VDD nodes of the two sides of the interface, the digital-to-current converter and the current-to-digital converter. The connection of the two similar junctions of the transistors, both drain connections of N-channel transistors, prevents current from flowing no matter what the power supply voltages are on either side of the interface.

Some of the features associated with the present invention are the ability to send multiple bits of digital data or information over a single interconnect 250, the implementation of the N-bit digital-to-current converter 230 and the current-to-N-bit digital converter 240. The method of the present invention transfers digital information similar to that of a parallel bus, but with only one interconnect. In other words, all of the information is available immediately and no waiting for the serial transmission of all of the control signals is required.

Figure 12:
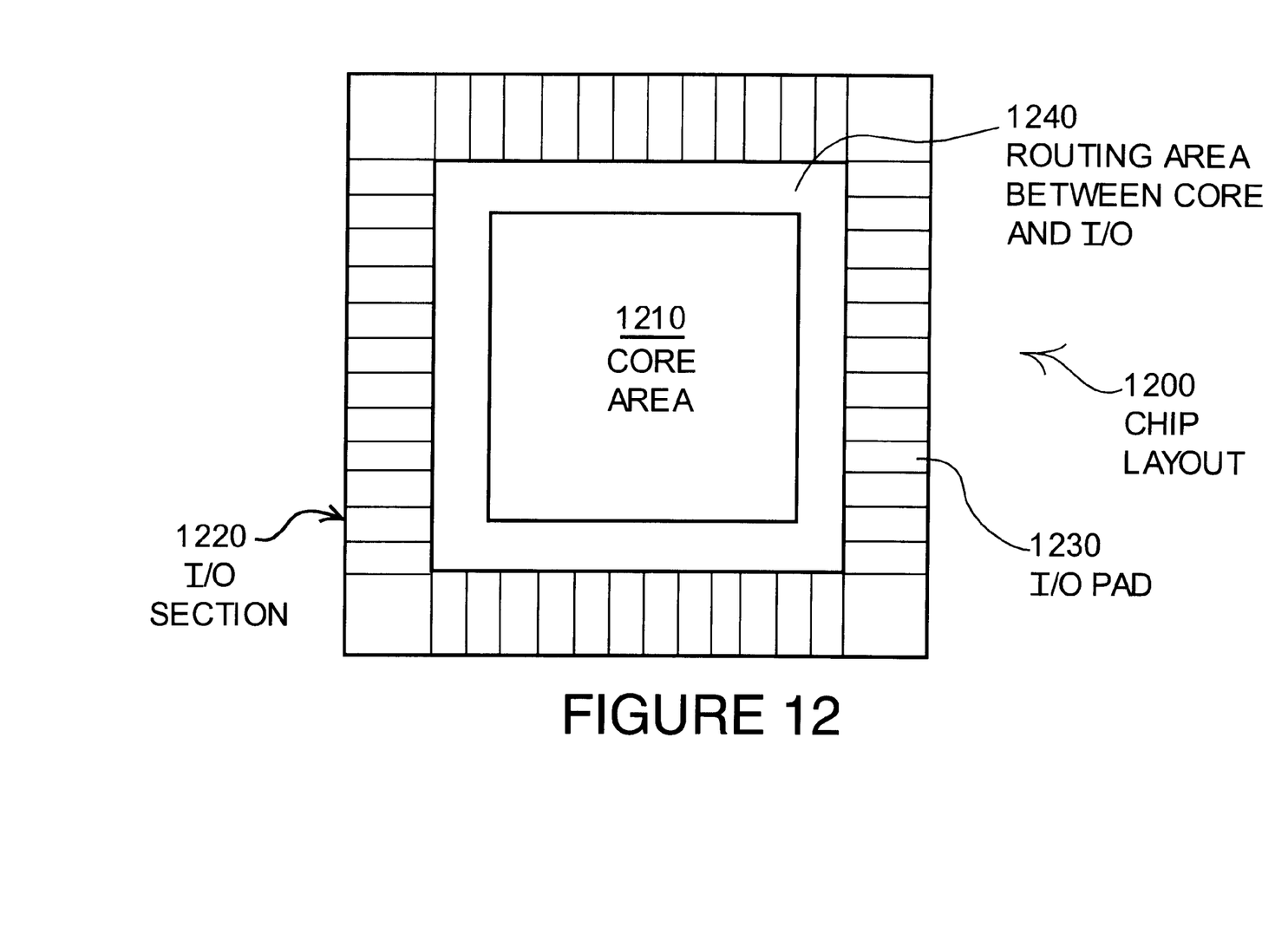
FIG. 12 is a block diagram illustrating an application of the present invention.

The invention is particularly of interest when communication between what is known as the core 1210 of the integrated circuit and what is known as the periphery or I/O section 1220 (see FIG. 12). When multiple control lines need to be routed between the core area 1210 of the IC and the I/O section 1220 of the IC, the invention will reduce the number of lines significantly. For example, digitally programming the slew rate of an output buffer might require a number of bits of digital data to be transferred between the core and the I/O of the IC. The output drive strength of the output may also require digital control lines also. Each additional control line that needs to be routed to the I/O pad through the routing area 1240 between the core 1210 and the I/O 1220 increases the routing congestion near each of the I/O pads 1230. A device with multiple pads that all have the requirement of having their slew rate and drive strength adjusted leads to severe routing congesting between the core area 1210 and the I/O section 1220. This invention will significantly reduce the area required for routing without significantly increasing the I/O section area 1220.

The present invention can also be applied between ICs in a chip-to-chip configuration and between PCBs, i.e., board-to-board. Specifically, two chips or boards are coupled together by an interconnect. A first chip or board converts a first signal to an encoded signal. That first chip or board then transmits the encoded signal over the interconnect. A second chip or board receives the encoded signal and converts it to a second signal. The signals may be a control signal. In addition, the present invention can be broadened to devices coupled together by an interconnect.

The present invention includes the many methods of transmitting the encoded signal. For example, a first device can convert a signal to an encoded signal. The first device can then maintain the encoded signal, such as by storing. The second device can then signal the first device to transmit the encoded signal.

Numerous variations and modifications of the embodiment described above may be effected without departing from the spirit and scope of the novel features of the invention. For example, the encoded signal can be transmitted over a single-ended interconnect or a differential pair. It is to be understood that no limitations with respect to the specific device illustrated herein are intended or should be inferred. It is, of course, intended to cover by the appended claims all such modifications as fall within the scope of the claims.

What is claimed is:

1. A method of encoding, transmitting and decoding a multibit signal for transmission on a single connector comprising:
    converting said multibit signal to an encoded signal by generating an encoded signal having multiple current levels using a scaling factor that represents the number of bits of said multibit signal;
    transmitting said encoded signal on said single connector;
    converting said encoded signal to said multibit signal by detecting said multiple current levels using detector transistors that are weighted to detect said encoded signal.

2. A method of encoding, transmitting and decoding a multibit signal for transmission on a single connector comprising:
    converting said multibit signal to an encoded signal by generating an encoded signal having multiple signal levels using an exponential scaling factor that represents the number of bits of said multibit signal;
    transmitting said encoded signal on said single connector;
    converting said encoded signal to said multibit signal by detecting said multiple signal levels using detector transistors that are weighted to detect said encoded signal.

3. The method of claim 2 wherein said exponential scaling factor is $2^N$ wherein N is equal to the number of bits to be encoded in said multibit signal.

4. A method of encoding, transmitting and decoding a multibit signal for transmission on a single connector comprising:
    converting said multibit signal to an encoded signal by generating an encoded signal having multiple signal levels using a scaling factor that represents the number of bits of said multibit signal;
    transmitting said encoded signal on said single connector;
    converting said encoded signal to said multibit signal by detecting said multiple signal levels using detector transistors that are weighted to detect said encoded signal and that have varying sizes that are consistent with said scaling factors.

5. The method of claim 4 wherein said detector transistors that are weighted to detect said multiple signal levels comprise load transistors that are weighted to be approximately one-half of the size of corresponding encoding transistors.

6. A method of encoding, transmitting and decoding a multibit signal for transmission on a single connector disposed in an integrated circuit comprising:
    converting said multibit signal to an encoded signal by generating an encoded signal having multiple signal levels using a scaling factor that represents the number of bits of said multibit signal;
    transmitting said encoded signal on said single connector;
    converting said encoded signal to said multibit signal by detecting said multiple signal levels using detector transistors that are weighted to detect said encoded signal.

7. A method of encoding, transmitting and decoding a multibit signal for transmission on a single connector that connects at least two integrated circuits comprising:
    converting said multibit signal to an encoded signal by generating an encoded signal having multiple signal levels using a scaling factor that represents the number of bits of said multibit signal;
    transmitting said encoded signal on said single connector;
    converting said encoded signal to said multibit signal by detecting said multiple signal levels using detector transistors that are weighted to detect said encoded signal.

8. An interface for encoding and decoding a multibit signal for transmission on a single connector comprising:
    a digital-to-current converter that is connected to receive said multibit signal having encoding transistors that are weighted by a scaling factor so that bits of said multibit signal are weighted by said scaling factor, said encoding transistors coupled together to generate a scaled current signal for transmission over said single connector;
    a current-to-digital converter that is connected to receive said scaled current signal having decoding transistors that are weighted to detect bits of said multibit signal by detecting current levels of said scaled current signal.

9. The interface of claim 8 wherein said single connector and said interface are disposed in an integrated circuit.

10. The interface of claim 8 wherein said interface is disposed in at least two integrated circuits and said single connector is disposed between said at least two integrated circuits.

11. The interface of claim 8 wherein said scaling factor is an exponential scaling factor.

12. The interface of claim 11 wherein said decoding transistors are weighted in a manner corresponding to said scaling factor.

13. The interface of claim 12 wherein said decoding transistors are weighted proportionally with corresponding encoding transistors.

14. The interface of claim 8 wherein said single connector comprises a differential pair of connectors.

15. The interface of claim 8 wherein said scaling factor is a geometric scaling factor.

16. The interface of claim 8 wherein said scaling factor is a linear function.

17. The interface of claim 8 wherein said single connector connects said digital-to-current converter to multiple current-to-digital converters using multiple single connectors.

* * * * *